United States Patent [19]

Miller

[11] Patent Number: 4,875,697
[45] Date of Patent: Oct. 24, 1989

[54] VARIABLE WHEELBASE LENGTH STEERING LINKAGE

[75] Inventor: Arden O. Miller, Fort Wayne, Ind.

[73] Assignee: Navistar International Transportation Corp., Chicago, Ill.

[21] Appl. No.: 279,486

[22] Filed: Dec. 2, 1988

[51] Int. Cl.⁴ .............................................. B62D 7/16
[52] U.S. Cl. ................................. 280/95.1; 280/846; 403/75
[58] Field of Search ...................... 280/95.1, 846, 673, 280/675; 180/906, 204; 403/75

[56] References Cited

U.S. PATENT DOCUMENTS

| | | | |
|---|---|---|---|
| 1,646,288 | 10/1927 | Graham | 403/136 |
| 1,940,466 | 12/1933 | Sneed | 403/75 |
| 2,217,560 | 10/1940 | Michon | 83/684 |
| 2,771,300 | 11/1956 | Latzen | 280/95.1 |
| 2,900,196 | 8/1959 | Nienke | 280/96.1 |
| 3,463,507 | 8/1969 | Butler | 280/95.1 |
| 4,079,807 | 3/1978 | Hornagold et al. | 280/95.1 |
| 4,162,859 | 7/1979 | McAfee | 403/75 |
| 4,653,773 | 3/1987 | Graft | 280/673 |

*Primary Examiner*—Kenneth R. Rice
*Attorney, Agent, or Firm*—F. David AuBuchon; Dennis K. Sullivan

[57] ABSTRACT

An adjustable Ackerman steering mechanism to adjust the steering knuckle arm and tie rod to operate with various wheelbase lengths of a motor vehicle.

15 Claims, 3 Drawing Sheets

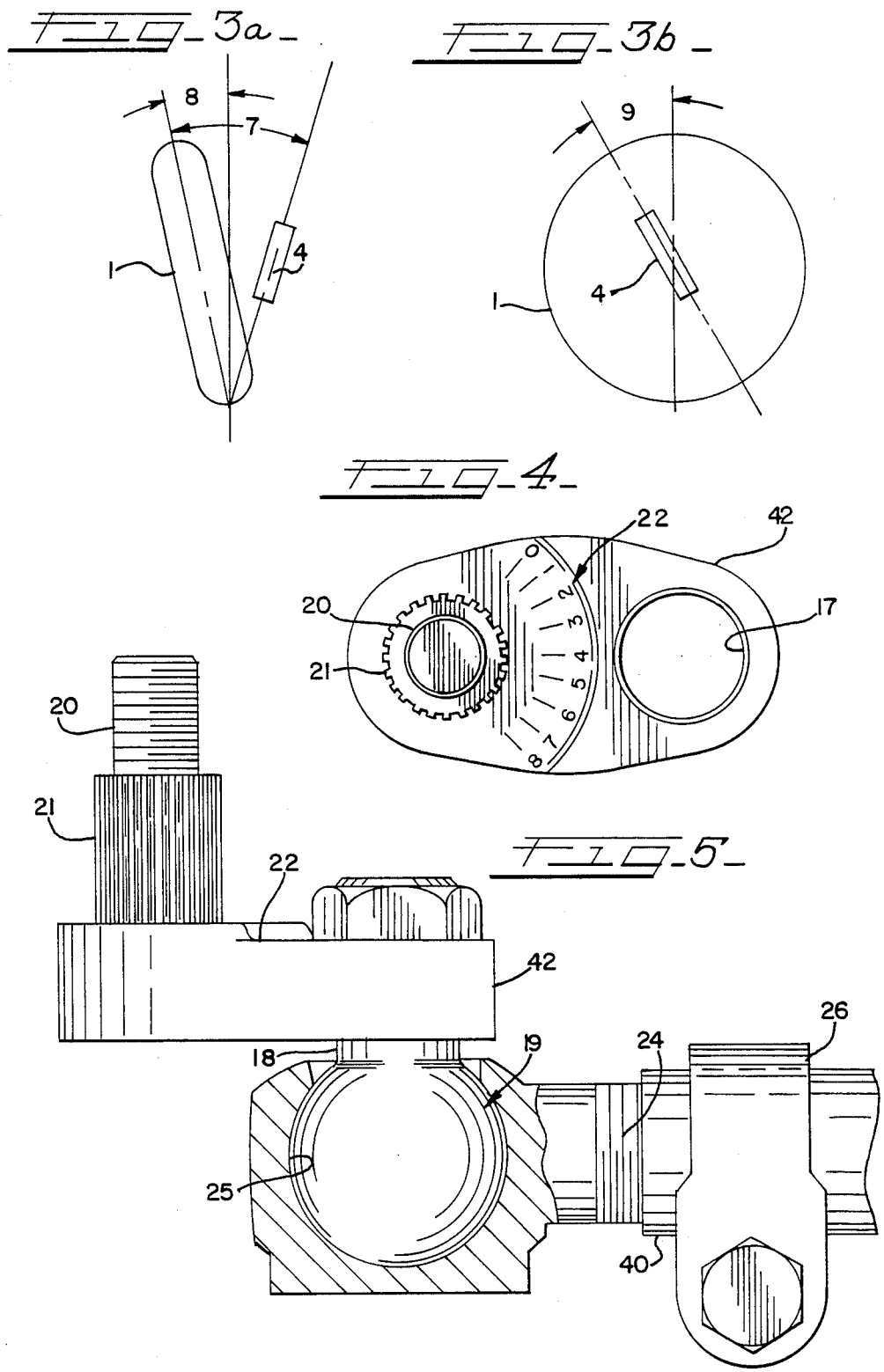

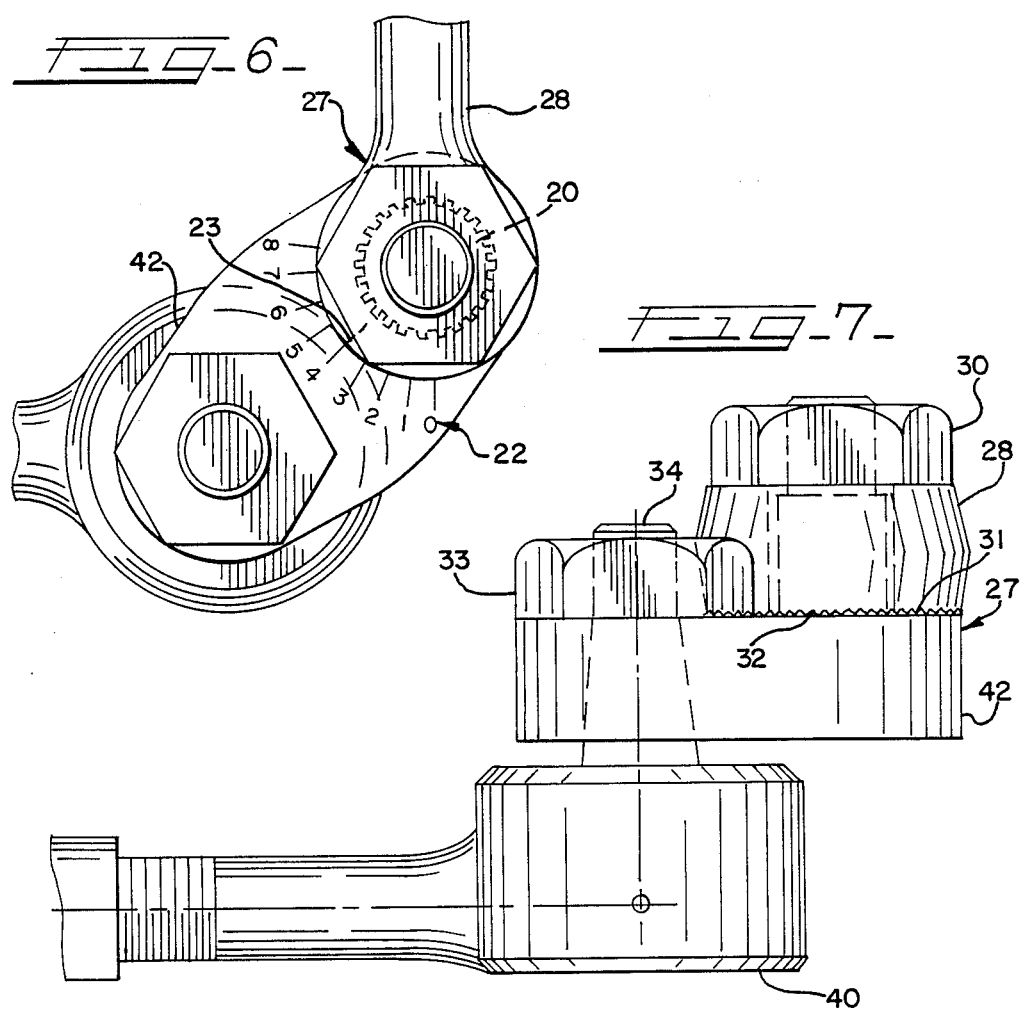
| CALCULATED ACKERMANN TYPICAL EXAMPLE ||||
| IDEAL WHEEL BASE | A | B | POSITION |
|---|---|---|---|
| 350 | 8.6 | 1.2 | 8 |
| 300 | 8.5 | 1.5 | 7 |
| 256 | 8.4 | 1.75 | 6 |
| 224 | 8.25 | 2.0 | 5 |
| 200 | 8.0 | 2.2 | 4 |
| 176 | 7.8 | 2.45 | 3 |
| 151 | 7.1 | 2.6 | 2 |
| 145 | 7.3 | 2.7 | 1 |
| 140 | 7.0 | 2.75 | 0 |

VARIABLE WHEELBASE LENGTH STEERING LINKAGE

BACKGROUND OF THE INVENTION

This invention relates to a steering mechanism and more particularly, to an adjustable Ackerman steering mechanism having an adjustable steering knuckle arm and tie rod to operate with various wheelbase lengths of a motor vehicle.

The steering mechanism on an Ackerman steering system turns the two steerable wheels of a motor vehicle so that all the wheels roll on circles with a common center. If the vehicle is to turn without lateral skid of any wheel, the center lines of all wheel axles must intersect when extended at every instant in a common center about which the vehicle turns. It is used universally on wheeled vehicles. For straight forward motion the front wheels are substantially parallel but as the vehicle enters a curve, the inner wheel turns more sharply than the outer wheel. The extreme condition occurs when the vehicle is on a curve of its minimum turning radius. A common configuration that produces Ackerman steering inclines the steering knuckle arms inwardly and rearwardly. The angle of the inclination depends on the wheelbase and the tread of the vehicle. Wheelbase is the distance from the front to the rear wheels measured between the centers of ground contact. Tread is the distance from the left wheel to the right wheel measured between the centers of ground contact.

To roll smoothly when a vehicle is directed at the desired course, the steerable wheels are mounted at a slight angle to the normal. As viewed from the driver's position, the wheel tilts outwardly from the vertical. This tilt is called camber and is positive if outwardly as shown in FIG. 3a. The wheels are given slight positive camber usually less than a degree initially, so that when the vehicle is loaded, the wheels become almost vertical.

The kingpin or axis of the pivot for the wheels is tilted slightly inward. The kingpin inclination causes the chassis to rise slightly when the wheels are turned. Thus the weight of the vehicle tends to keep the wheels turned straight ahead or to return it to that position after a turn. This self return of a steering system to the straight line travel is called recovery.

Camber and kingpin inclination together are called the included angle. If the apex of this angle lies on the road surface road resistance on the tire and forward push on the kingpin are along the line of roll. If the apex is not on the road, the tire is forced to toe in or out. To take up play in the front wheel supports, the front wheels are purposely toed in slightly so that the planes of the wheels intersect ahead of the vehicle. Road resistance then forces them to roll parallel and takes up any play in the steering system. The inclination of the kingpin or its equivalent forward or backward is called caster. Caster is positive if the kingpin inclination is backward, negative if it inclines forward and zero if the kingpin is vertical as viewed along the line of the front wheels. Positive caster aids in directional stability and in recovery.

The wheelbase on a motor vehicle varies depending on the size and the length of the vehicle. Although automobiles generally have a fixed wheelbase for a given model, highway trucks are frequently manufactured with different length wheelbases in a given model line depending on the type of body and the use to which the vehicle will be put. The differential rate of steering of the steerable wheels is varied with a variation in the wheelbase. With a longer wheelbase, the differential rate of steering of the steerable wheels is less than with a short wheelbase. Adjustment to vary the rate of differential steering, in other words, the degree of toe out of the outside wheels relative to the inside wheel, is varied. The differential rate of steering and the degree of toe out can be controlled with the angle of the steering knuckle arm relative to the wheel spindle. Also, the tie rod length is varied when the angle of the steering knuckle arm is varied. When the motor vehicle is manufactured, these relative angles are taken into consideration. Accordingly the present invention deals with a single steering assembly which is adjustable to accommodate a selected one of a range of wheelbase lengths. Optimum steering geometry is provided by adjusting the steering knuckle arm and the tie rod.

THE PRIOR ART

U.S. Pat. No. 4,162,859 to McAfee shows a steering mechanism using the Ackerman steering principal. Since it is critical that the steering angle of the wheels relative to each other be maintained at a certain relationship, the steering knuckle arm angle is adjustable by rotating the offset shank of the ball in the joint between the steering knuckle arm and the tie rod. Small adjustments are made to assure a desired steering angle for each wheel and the tie rod is adjusted to provide the required toe out for the wheels during the steering operation. The present invention provides an adjustable adaptor link between the tie rod ball joint and the steering knuckle arm which adjusts the effective angle of the steering knuckle arm relative to the steerable wheel spindle. The present invention is designed to cover any selected wheelbase length within a broad range of wheelbase lengths to optimally operate with the desired steering knuckle arm and tie rod length to give optimum steering geometry whereas McAfee is not concerned with wheelbase variation.

SUMMARY OF THE INVENTION

It is an object of this invention to provide an adaptor link in a steering mechanism to allow a common axle assembly to be used over a range of vehicle wheelbases while providing optimum steering geometry.

It is another object of this invention to provide an adjustable steering knuckle arm on a vehicle in an Ackerman vehicle steering mechanism to allow one axle assembly to be used with various vehicle wheelbase lengths and to provide optimum steering geometry.

It is a further object of this invention to provide an adjustable steering knuckle link in a vehicle steering mechanism and to accommodate a common axle assembly while permitting use thereof with any selected one of a number of vehicle wheelbase lengths and still provide optimum steering geometry.

A more specific object of the invention is to provide a front axle assembly having a steering linkage which is adjustable to accommodate various wheelbases and having indicia theron for indicating various wheelbase lengths.

The present invention is accomplished in an Ackerman vehicle steering mechanism with an adjustable steering knuckle arm to vary the effective angle of the arm with the tie rod. The end of the steering knuckle arm is fitted with a link selectively pivoted and secured to provide various effective angles of the steering knuckle arm corresponding to different wheelbase lengths denoted by indicia on the adjusting mechanism. The adjustment varies the differential rate of steering of the steerable wheel to provide optimum steering geometry. The length of the tie rod is altered from wheelbase to wheelbase to accommodate the adjustment.

DECRIPTION OF THE DRAWINGS

Referring to the drawings, FIG. 1 illustrates a schematic diagram of a motor vehicle steering mechanism incorporating the invention.

FIGS. 3A & 3B show kingpin inclination and camber and caster.

FIG. 4 is a plan view of the adaptor link which forms a part of the steering knuckle arm.

FIG. 5 is a side elevation view of the adaptor link connected through a ball joint to the tie rod.

FIG. 6 is a plan view of the steering knuckle arm and its position relative to the kingpin axis at the level of the wheel spindle.

FIG. 7 is a side elevation view of the connection between the adaptor link on the steering knuckle arm and the tie rod.

FIG. 8 is a table indicating the index position for various wheelbases of a vehicle incorporating the invention.

DETAILED DESCRIPTION OF THE PREFERRED EMBODIMENT

Figure 1:
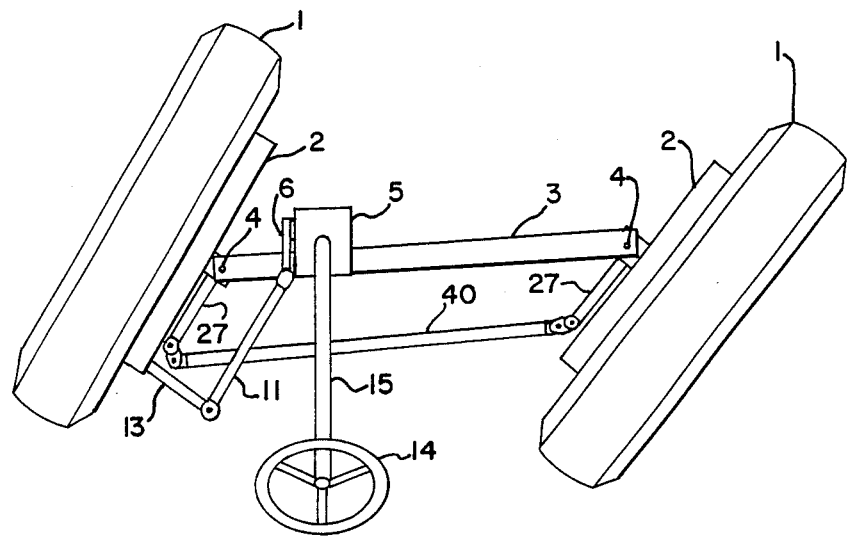

Referring to FIG. 1, the steerable wheels are shown rotatably mounted on the wheel spindles 2 pivotally mounted to opposite ends of axle beam 3 through kingpins 4. A steering gear box 5 rotates a pitman arm 6 pivotally connected to a drag link 11 in turn pivotally connected to a steering arm 13 secured to the left wheel spindle 2 to control the movement of left wheel 1. Steering knuckle assemblies 27 are attached to the wheel spindles 2 and extend generally horizontally rearwardly to distal ends pivotally interconnected by tie rod 40 to cause the right wheel to follow movements of the left wheel. The steering gear 5 is operated by the steering wheel 14 through the steering shaft 15. The steering mechanism shown is a mechanical steering mechanism and the power to operate the steering mechanism comes from the operator.

FIGS. 3 A and 3 B show the left front wheel 1 of a vehicle and all angles are greatly exaggerated for clarity. As viewed from the driver's seat, the wheel 1 is tilted outwardly from the vertical and this is called camber 8 and is positive if outward as shown. The wheels are given a slight positive camber, usually less than a degree initially, so that when the wheel is loaded, the wheels become almost vertical.

The kingpin 4 or axis of pivot is tilted inward. This kingpin inclination causes the chassis to rise when the wheel turns. Thus the vehicle tends to keep the wheels turned straight ahead and to return to this position after a turn. This self return in the steering system to the straight line travel is called recovery.

Camber 8 and kingpin inclination together are called the included angle 7. If the apex of this angle lies on the road surface under the tire, the road resistance of the tire and the forward push of the kingpin are along the line of roll. To take play out of the front wheel support, the front wheels are purposely toed in slightly so that the planes of the wheels intersect ahead of the vehicle. Road resistance then forces them to roll parallel and take up any play in the steering system. The inclination of the kingpin 4 forward or backward is called caster. The caster angle 9 is positive if the kingpin inclines backward and negative if it inclines forward and zero if the kingpin is vertical as viewed along the axis of the wheel 1. A positive caster aids in directional stability and recovery.

Figure 2:
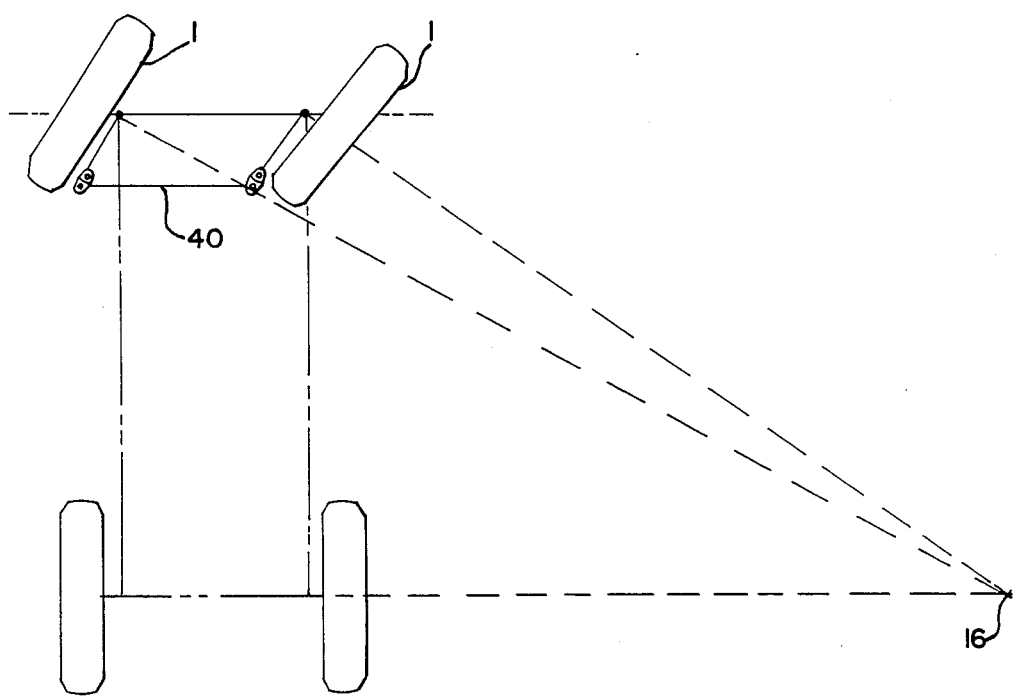
FIG. 2 illustrates a diagram of the steering mechanism on a motor vehicle in which the wheels roll on circles with a common center which is characteristic of Ackerman steering.

FIG. 2 illustrates the diagram for Ackerman steering in which each wheel rolls on a circle having a common center 16. The steerable wheels normally have a slight toe in but when the wheels begin to turn the inner wheel turns at a faster rate than the outer wheel and this produces a slight toe out. The center of the circles show this in FIG. 2 with each wheel rotating on a circle with a common center 16. The differential rate of steering of the steerable wheels is controlled by the steering knuckle arm and the tie rod. The length of the tie rod and effective angle of the steering knuckle arm relative to the wheel spindle axis can be varied to alter the rate of steering of the steerable wheels.

FIG. 4 shows the horizontal adaptor link 42 which forms a part of the steering knuckle assembly 27. The adaptor link is formed with a vertical opening 17 which receives the tapered shank 18 of the ball 19 of the tie rod joint. The adaptor link is also formed with a vertical shaft 20 which has a splines 21 for engaging mating splines 21 on the steering knuckle arm 28 and providing a plurality of selectively rotated positions about the vertical axis of shaft 20. The adaptor link 42 has indicator numbers 22 which operate in conjunction with an index mark 23 (FIG. 6) on the steering knuckle arm 8. The adaptor link 42 is provided with a 36-tooth spline; however, any number of spline teeth may be used depending on the need for adjustment of the relative position between the adaptor link and the steering knuckle arm.

FIG. 5 shows the adaptor link 42 connected to the tie rod 40. The adaptor link 42 is connected to the shank 18 of the ball 19 which in turn fits into a socket 25 of the tie rod 40. The tie rod 40 is provided with a threaded portion 24 for extending or shortening of the tie rod. A clamp 26 is bolted to lock the position of the tie rod and fix the length once the adaptor link is adjusted. The adaptor link varies the steering knuckle angle and the length of tie rod must be varied to accommodate for the change in length between the steering knuckle arms. However, since the wheelbase of a truck is not likely to change after manufacture, a fixed length tie rod, with the length dependent on the desired wheelbase, could be used.

Referring to FIGS. 6 and 7, the steering knuckle assembly 27 is shown. The steering knuckle assembly 27 includes the steering knuckle arm 28 which is fitted to the adaptor link 42 through the splined shaft 20. The adjustment to vary the steering knuckle arm angle relative to the wheel spindle is accomplished by the rotation of the adaptor link 42 relative to the steering knuckle arm 28. The index mark 23 is positioned on the appropriate index number 22 in accordance with the table shown in FIG. 8. The table shown in FIG. 8 correlates the wheelbase length of the motor vehicle relative to the position of the index number 22 and the index mark 23. Dimension A of the Table 8 relates to the distance tie rod from the center of tie rod ball 19, i.e., the pivot joint, to the center line of the axle 3. B indicates the lateral distance between the center of the tie rod ball 19 and the kingpin axis at the level of the wheel spindle. When the wheelbase length is known, the position of the index mark relative to the index numbers can be adjusted to provide the proper steering geometry. Because of the great range of wheelbase lengths used in trucks, as shown in table 8, the radial length of the adaptor link 42, i.e., the distance between the axis of vertical opening 17 and the vertical axis of shaft 20, is substantially greater than the radius of the ball 19 of the tie rod ball joint. The dimensions A & B are provided for reference purposes only and would not be necessary to adjust an adaptor link for a wheelbase length shown on the table.

The steering knuckle Assembly 27 is locked in position by the splines 21 in the mating splined opening of the steering knuckle arm 28. The nut 30 firmly fastens these two members together. The serrated surface 31 on the adaptor link and also a mating surface 32 on the steering knuckle arm support may also be used to firmly seat and lock the two members together as well and may be used in place of splines 21. The adaptor link 42 is fastened to the tie rod by the nut 33 on the bolt shank 34 of the ball 19.

The device operates in the following manner. The steering mechanism as illustrated in FIG. 1 is mechanically operated by rotation of the steering wheel 14. This causes the steering gear pitman 6 to pull or push the drag link 11 and thus the steering arm 13 on the left wheel. The left wheel steering knuckle assembly 27 in turn operates the tie rod 40 to control the right wheel through steering knuckle assembly 27. The rate of steering of the steerable wheel 1 is controlled by the effective included angle between a line drawn from the pivot axis of each of the steering knuckle assemblies 27 to the kingpin center 4 and the axis of spindle 2 on the steerable wheel 1. A shorter tie rod and greater angle will create a greater relative steering rate between the two wheels.

The wheelbase of the vehicle will be known when the vehicle is manufactured and, accordingly, reference may be made to the table in FIG. 8 for the known wheelbase and the adjustment of adaptor link 42 will be made in accordance with the appropriate index number 22 and mark 23. The tie rod 40 then is adjusted or selected to fit with the new angle for the steering knuckle assembly 27. The adaptor link adjustment will change the angle of the steering knuckle assembly and also the length of the tie rod to provide the proper steering geometry for the steering mechanism with the predetermined wheelbase.

Accordingly, one steering front axle model can be used to operate with any of the selected wheelbases as shown on the table in FIG. 8. This will provide the optimum steering geometry required.

The embodiments of the invention in which an exclusive property or privilege is claimed are defined as follows:

1. A steering mechanism comprising a steering knuckle assembly adaptable for connection to a wheel spindle including a steering knuckle arm, an adaptor link adjustably connected to said steering knuckle arm to form said steering knuckle assembly, a tie rod pivotly connected to said steering knuckle assembly, indexing means on said link and arm to indicate the positional relationship therebetween for operation with a selected one of a range of vehicle wheelbases.

2. A vehicle steering mechanism as set forth in claim 1 including a spline connection between said adaptor link and said steering knuckle arm.

3. A vehicle steering mechanism as set forth in claim 1 including a wheel spindle supporting said steering knuckle assembly, a selectively secured connection between said steering knuckle arm and said adaptor link disposed to permit displacement of said link in one of a plurality of rotated positions relative to said steering arm to change the relative effective angle of the steering knuckle assembly with said wheel spindle axis.

4. A vehicle steering mechanism as set forth in claim 1 including a connection between said steering knuckle arm and said link defining a means to vary the angle of said link relative to said knuckle arm to vary the steering knuckle angle relative to an axle for the steerable wheel, and means for locking said connection in an adjusted position.

5. A vehicle steering mechanism as set forth in claim 1 including index numbers and an index mark on said steering knuckle arm and said adaptor link to indicate the relative positions of said members and the correlation with a selected one of a plurality of wheelbases.

6. A vehicle steering mechanism comprising, a steering knuckle assembly including, a steering knuckle arm, an adaptor link adjustably connected to said steering knuckle arm, indexing means on said steering knuckle arm and said link to indicate the relative adjusted positions of said arm and link for operation with one of a selected range of vehicle wheelbase.

7. A vehicle steering mechanism as set forth in claim 6 wherein said indicators include an indicator mark on said steering knuckle arm and a plurality of index numbers on said adaptor link.

8. A vehicle steering mechanism comprising a steering knuckle assembly adapted for connection to a wheel spindle including a steering knuckle arm, an adaptor link adjustably connected to said steering knuckle assembly, indexing means on said support and link indicating the relative adjusted position of said support and link for selective operation and optimum steering geometry with one of a selected range of vehicle wheelbases, a tie rod universally connected to said steering knuckle arm and adjustable to compensate for adjustment of said steering knuckle assembly.

9. A vehicle steering mechanism as set forth in claim 8 including means on said tie rod including threads on an internal and external connection for adjusting the length of said tie rod, locking means for locking said tie rod in the adjusted position.

10. A vehicle steering mechanism as set forth in claim 8 wherein the connection between said steering knuckle arm support and said adaptor link define a spline connection and a serrated surface between said support and link to firmly lock said link on said support in a fixed position.

11. A front axle assembly for a truck comprising:
a center beam assembly having kingpins at each end defining pivotal coupling axes;
wheel spindles pivotally mounted to each end of said center beam for movement respectively about said kingpin axes;
steering knuckle arms attached respectively to each wheel spindle and extending horizontally therefrom to a distal end remote from the kingpin axes;
a horizontal adaptor link selectively secured to each steering knuckle arm in one of a plurality of positions rotated about a vertical axis through said distal end of said steering knuckle arm, said horizontal link having a vertical opening radially displaced from said vertical axis; and a tie rod pivotally connected between each of said adaptor links, said tie rod having at each end a ball joint including a socket, a ball disposed in said socket, and a shank extending from said ball, said shank being fixedly secured within said vertical opening of said adaptor link.

12. A front axle assembly as set forth in claim 11 and the radial displacement of said vertical opening of said horizontal link from the vertical axis thereof being greater than the radius of said ball of said tie rod ball joint 13. A front axle assembly as set forth in claim 11 and said steering knuckle arm and said horizontal adoptor link having cooperative indexing means for denoting the adjusted position of said link.

14. A front axle assembly as set forth in claim 11 and said horizontal adoptor link and said steering knuckle having cooperative splines for determining the rotational relation of said link relative to said steering knuckle arm.

15. A front axle assembly as set forth in claim 11 and cooperative serrations disposed respectively on said adoptor link and said steering knuckle arm for firmly locking said link in a selected rotated position relative to said steering knuckle arm.

* * * * *